United States Patent

[11] 3,548,809

| [72] | Inventor | Francesco Conti |
| | | Via Borgogna 8, Milan, Italy |
| [21] | Appl. No. | 793,618 |
| [22] | Filed | Jan. 23, 1969 |
| [45] | Patented | Dec. 22, 1970 |
| [32] | Priority | Aug. 7, 1968 |
| [33] | | Italy |
| [31] | | No. 19,911/68 |

[54] DEVICE FOR STIMULATING THE FLOW OF FLUIDS IN AN ANIMAL BODY
10 Claims, 9 Drawing Figs.

| [52] | U.S. Cl. | 128/24, 128/64 |
| [51] | Int. Cl. | A61h 1/00 |
| [50] | Field of Search | 128/24, 24.1, 24.2, 64, 87 |

[56] References Cited
UNITED STATES PATENTS

| 2,361,242 | 10/1944 | Rosett | 128/24UX |
| 3,083,708 | 4/1963 | Gottfried | 128/24UX |
| 3,303,841 | 2/1967 | Dennis | 128/24 |

Primary Examiner—L. W. Trapp
Attorneys—Guido Modiano and Albert Josif

ABSTRACT: A device for stimulating the flow of fluids inside an animal body, particularly the blood or lymphatic flow in the lower or upper limbs of an animal which comprising a resilient outer envelope member, an inner resilient envelope member inserted in said outer envelope member and connected thereto to define an interspace said envelopes being closed at one end and open at the opposite end to form an opening for receiving the limb of a body, means being provided for supplying and evacuating fluid under pressure to and from said interspace in order to increase and decrease the pressure in said interspace and cause the wall of said second envelope to move inwards and come into pressure contact with said limb.

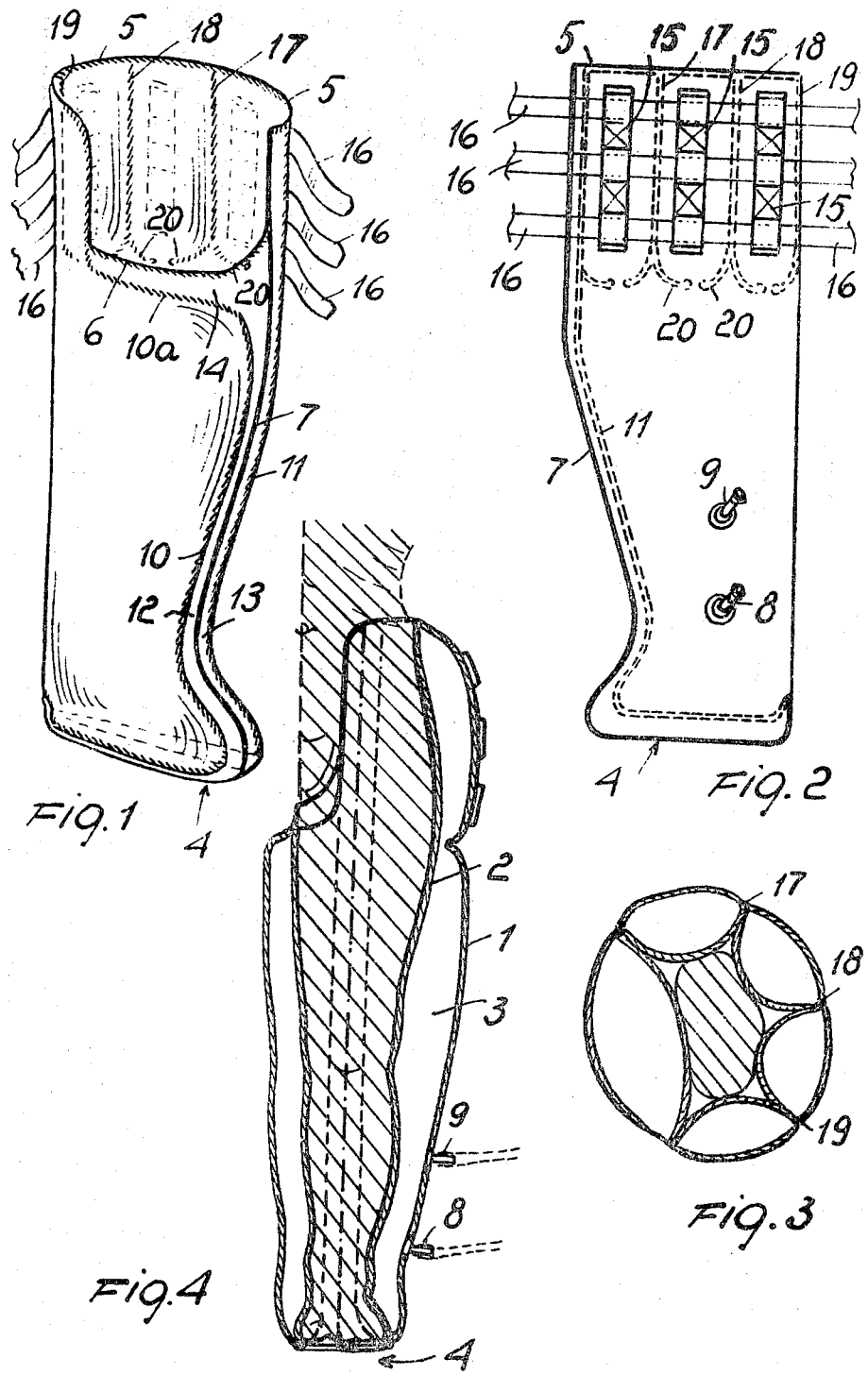

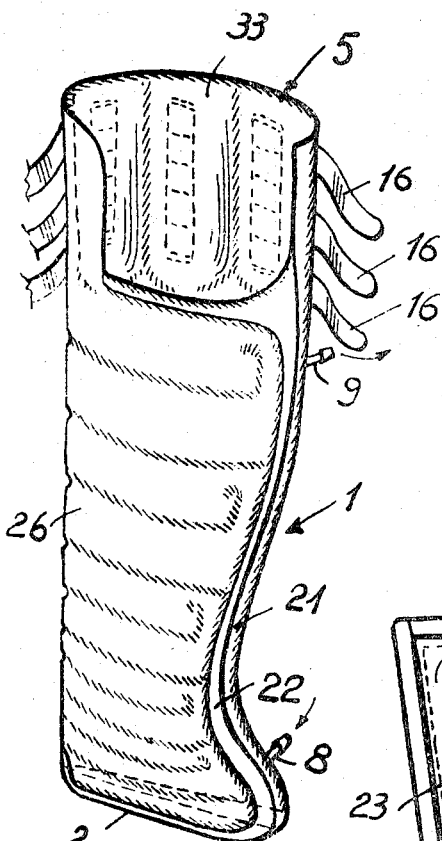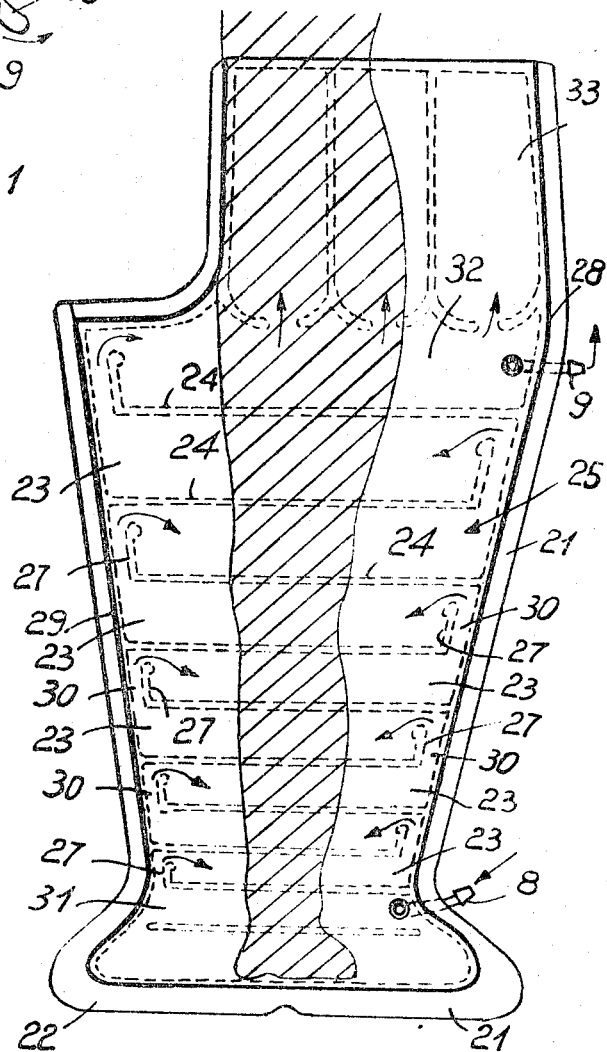

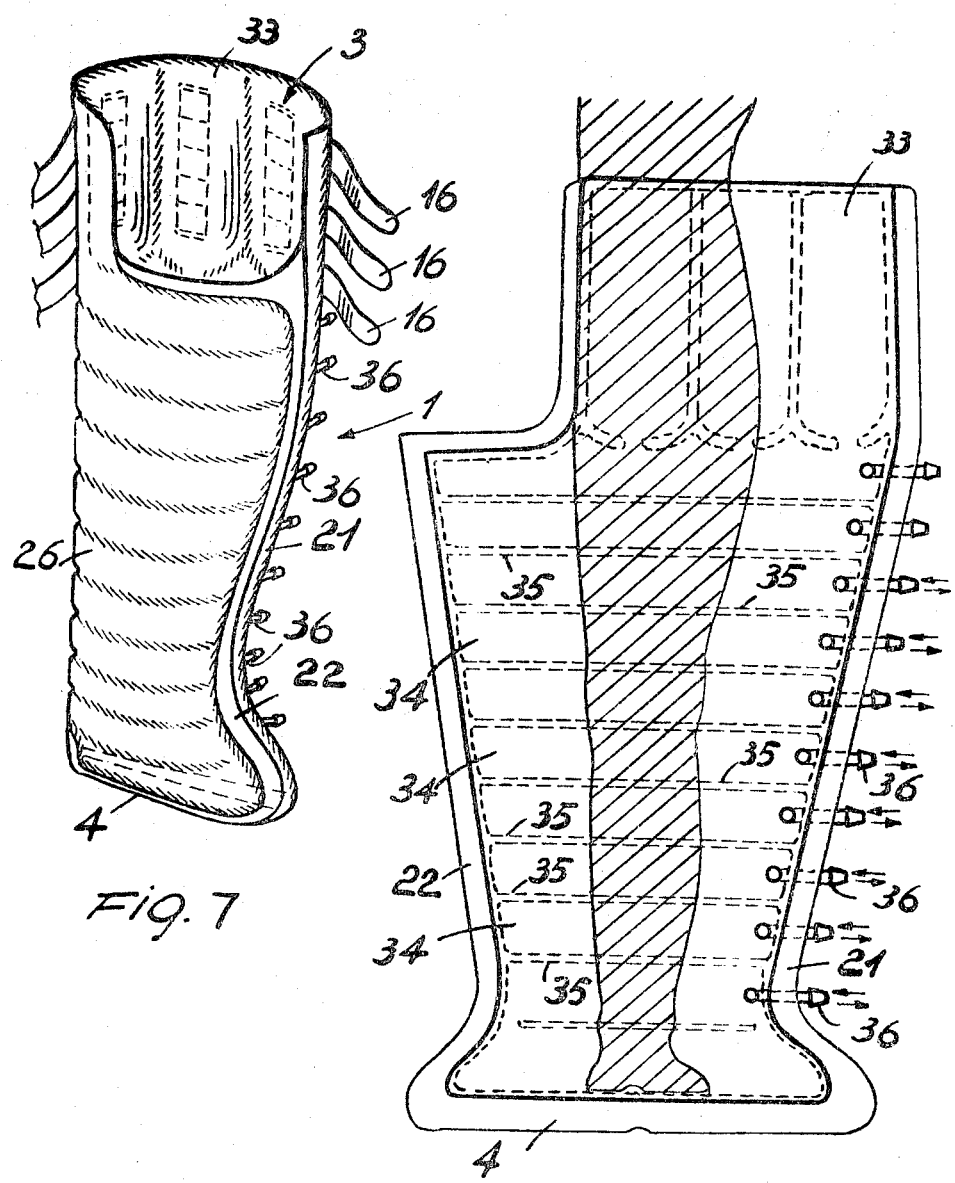

3,548,809

DEVICE FOR STIMULATING THE FLOW OF FLUIDS IN AN ANIMAL BODY

BACKGROUND OF THE INVENTION

The present invention relates to a device for stimulating the flow of fluids inside an animal body. More particularly this invention relates to a device having a structure designed to stimulate the blood or lymphatic flow in the lower or upper limbs of an animal.

It is known that in certain conditions it is advantageous to force or at least stimulate the blood or lymphatic flow in the limbs of an animal body and particularly so in case of the lower limbs. Such stimulation is particularly advantageous in certain postoperational and convalescence conditions.

It is also known that the stimulation of the flow of fluids in the body, particularly in the lower limbs, enables when suitably controlled, a considerable reduction in the accumulation of fat and cellulitis.

At present such stimulation is effected particularly by means of massage which is sometimes conducted together with auxiliary devices and apparatus. The efficiency of these known methods is, however, strictly dependent on the skill of the masseur and on the constancy of the treatment which is possibly combined with a special diet.

The main object of this invention is that of providing a stimulator device which enables the stimulation of the flow of fluids, particularly lymphatic and blood fluids, in the limbs of a body so as to reduce the accumulation of fat, cellulitis and the like, and at the same time obviates the inconveniences of the traditional methods, that is to say a device which provides rapid results without the aid of a masseur.

Another object of this invention is that of providing a stimulator device which essentially works on the principle of an efficient, rigorously controllable massage carried out by means of the use of pneumatically operated auxiliary apparatus.

A further object of this invention is that of providing a stimulation device of the described type which is designed to exploit the massage action of a fluid supplied to the device under pressure.

A still further object of this invention is that of providing a device which may readily be produced from commercially available materials with known work techniques.

SUMMARY OF THE INVENTION

According to the invention there is provided a device for stimulating the flow of fluids in the limbs of a body which comprises a first extended envelope in resiliently deformable material, a second envelope in resiliently deformable material arranged inside said first envelope and connected thereto to define an interspace, said first envelope being closed at one end and open at the opposite end to form an opening, said opening being shaped so that a portion thereof may receive the side of the user and the remaining portion thereof may receive the user's groin, valve means being provided for supplying and evacuating a fluid under pressure to and from said interspace in order to increase and decrease the pressure in said interspace, the increase of pressure in said interspace being arranged to cause the wall of said second envelope to move inwards and come into pressure contact with the limb to which the stimulator device is fitted, securing means being provided for the firm releasable fitting of the stimulator device to the side of the user.

BRIEF DESCRIPTION OF THE DRAWINGS

Further characteristics and advantages of the invention will appear more clearly from the following detailed description of a preferred embodiment of a stimulator device according to the invention, illustrated by way of example in the accompanying drawings in which:

FIG. 1 shows in perspective view, a stimulator device according to the invention designed for use on a lower limb of a body;

FIG. 2 shows a side view of the stimulator device of FIG. 1;

FIG. 3 shows, to an enlarged scale, across section of the stimulator device taken through the inlet of the device;

FIG. 4 is a sectioned elevational view of the stimulator device of FIGS. 1 to 3;

FIG. 5 is a perspective view of an alternative embodiment of the stimulator device according to the invention;

FIG. 6 is a diagrammatic view of the development of the stimulator device of FIG. 5;

FIG. 7 is a perspective view of another embodiment of the stimulator device according to the invention;

FIG. 8 is a development of the stimulator device of FIG. 7; and

DESCRIPTION OF THE PREFERRED EMBODIMENTS

Figure 9:
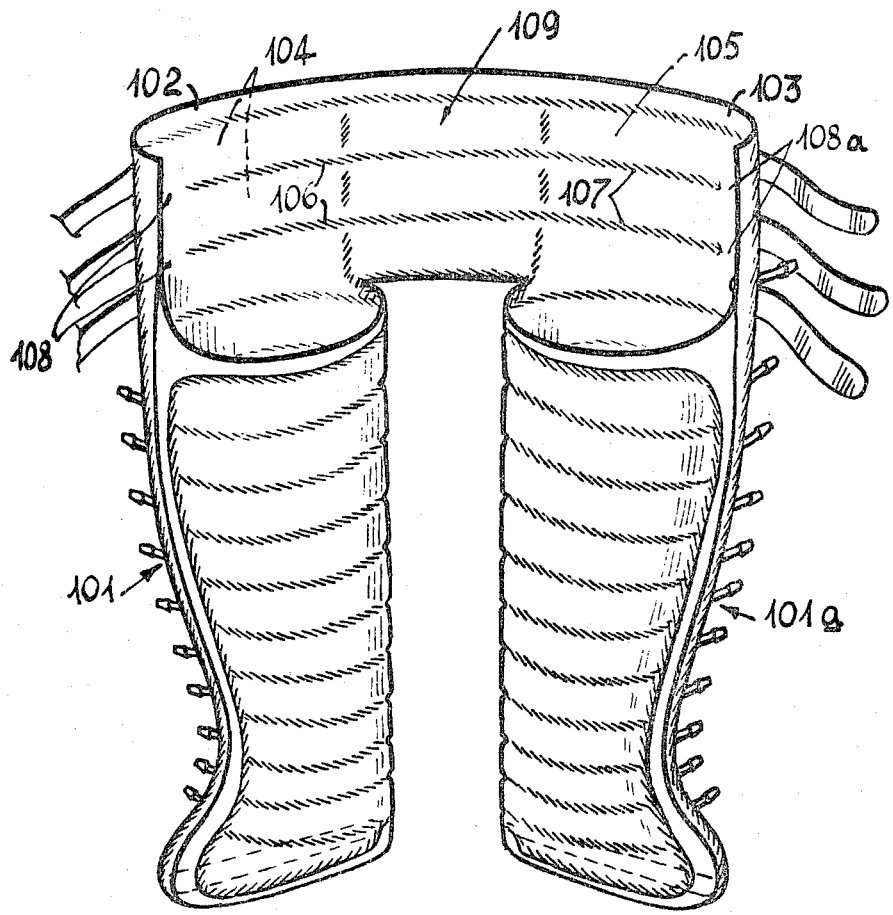
FIG. 9 is a perspective view of a further embodiment of stimulator device according to the invention.

With reference to FIGS. 1 to 4, the stimulator device according to the invention comprises an extended envelope 1 which is shaped to substantially correspond to the limb to which it is designed to be applied. Said envelope 1 is formed of relatively resilient material such as spun rubber, reinforced synthetic plastics material and the like. Inside said envelope 1 there is arranged a second envelope 2 which is of extended length and is formed in a material which is more resilient that the material from which said envelope 1 is formed. Between said envelopes 1 and 2 there is defined a longitudinal annular interspace or gap 3 and the two envelopes together form an extended unit which has a closed lower end 4 and an opened upper end. At the upper end of said envelope unit there is provided an opening or inlet which is shaped for fitting to the side of a user along a portion 5 thereof and grips the groin of the user along the remaining portion 6 thereof. The envelopes 1 and 2 are connected together along a join line (made, for example, by heat soldering) indicated in FIG. 1 at reference numeral 7. Said join line 7 corresponds for a certain distance to the front part of the limb, then extends into the foot and along a further section corresponds exactly to the profile of said opening. The interspace 3 is in communication with a fluid pressure source through a valve body 8 and communicates with a suction source through a valve body 9.

Said envelopes 1 and 2 are further connected together, for example, by heat soldering, along lines 10 and 11 which extend substantially parallel to one another and are spaced from said join line 7. Said join line 10 is arranged in the inner portion of the device and is upwardly provided with an extension 10a which is parallel to and spaced from, said portion 6 of the opening. Said extension 10a is designed to protect the inner upper part of the user's thigh and is intended to be filled to the user's groin. Said join lines 10, 11 and 10a define together with said join lines 6 and 7, zones 12, 13 and 14 respectively which do not communicate with said interspace 3.

Said envelope unit 1—2 which constitutes the device according to the invention is outwardly provided with a plurality of through holes 15 (FIG. 2) which receive straps 16 designed to ensure the fitting of the device to the side of the user with the desired force and stability.

The working of the embodiment of the stimulator device described above with reference to FIGS. 1 to 4, is as follows.

The user inserts his limb inside the envelope unit 1—2 in the position shown in FIG. 4 and tightens the device in the required position by means of straps 16. At this point an apparatus designed to supply and suck fluid under pressure to and from said interspace 3 is put into operation. This apparatus (which is not shown) essentially comprises a fluid pressure source, for example a pump, and a suction source. The working times of the fluid pressure source and the suction source are controlled by known devices.

This apparatus is arranged to supply fluid, for example air, under pressure into the interspace 3 so as to deform the envelopes 1 and 2 and suitably push the internal envelope 2 inwards so as to contact the user's limb. Successively, after a preestablished time interval, the supply of said fluid under pressure is stopped and the interspace 3 is evacuated through the valve body 9. The repetition of the supply and evacuation of fluid under pressure in the interspace 3 causes a substantially massage-like effect which is rigorously controlled in intensity and duration.

The presence of the join lines 10 and 11 and the rigid band 10a ensures that the supply of fluid under pressure into the interspace 3 does not cause a pressure effect in the groin zone 14, the front zone 12—13 of the limb and the zone underneath the foot. This arrangement is particularly advantageous because it ensures that no harmful pressure is exercised in the groin zone which could cause partial or total blocking of important blood vessels with consequent adverse effects to the user. Since the zone beneath the foot is not subject to any pressure action due to the presence of fluid in the interspace 3 it substantially constitutes a support base for the foot and prevents such pressure from causing distortions or other painful movement of the end of the limb.

Advantageously the envelopes 1 and 2 are provided adjacent the opening with a zone which substantially covers the gluteus of the user, and longitudinal join lines 17, 18 and 19 which terminate with portions 20. Said join lines 17, 18 and 19 define longitudinal gaps which do not communicate with each other laterally and which assume the form shown in FIG. 3 when fluid under pressure is passed into said interspace 3. The upper zones defined by the join lines 17, 18 and 19 contribute considerably to a uniform pressure distribution as well as notable slackening of pressure in the groin portion 14.

In repeated controlled practical tests it has been established that the stimulator device according to the invention completely satisfies the predetermined objects, particularly as regards the stimulation of the blood and lymphatic flows inside limbs. It was also noted that said device enables, in a short time and with a limited number of applications, a considerable reduction of possible accumulations of fat cellulitis and the like.

The invention as thus conceived may be subject to numerous variations and modifications within the scope of the appended claims. Thus, for example, while the device according to the invention has been described in relation to applications to lower limbs it may also be designed to be fitted to upper limbs or portions thereof. Moreover said valve bodies may be arranged to simultaneously communicate with a fluid pressure supply source and, after a given time interval, simultaneously communicate with a suction source in order to provide a massage action of the described type.

In addition the fluid employed in the interspace between the envelopes may comprise, instead of air, inert liquids which may be heated and/or cooled. By using heated or cooled liquids it is possible to combine a temperature action to said pressure action.

An alternative embodiment of the stimulator device according to the invention is illustrated in FIGS. 5 to 9;

With reference to FIGS. 3, 5 and 6 the stimulator device according to the invention is shown for use with lower limbs of a human body.

In FIG. 5 the parts which are identical to those described with reference to FIGS. 1 to 4 retain the same reference numerals.

In the first modified embodiment of the stimulator device according to the invention (FIG. 6) said envelope 1 is obtained for application to lower limbs as shown in FIG. 5 from a flat element which substantially constitutes the development of said envelope. Said flat element is peripherally bounded by a pair of edges 21 and 22 which are associated to each other by simple pressure action. Said edges 21 and 22 are advantageously and preferably formed, for example, in commercially available material consisting of hook-ended needle-like layers (edge 21) and a layer always in substantially felted synthetic material (edge 22). The connection between the edges 21 and 22 is preferably effected along the front median line (FIG. 5) of the stimulator device according to the invention.

Said interspace, defined in the central surface of the envelope 1 is divided into a plurality of transverse chambers 23 defined by transverse solder join lines 24 which connect the internal and external walls 25 and 26 of said interspace together. Said transverse join lines 24 are alternately provided (FIG. 6) with upwardly bent portions 27 which are spaced from longitudinal solder join lines 28 and 29 so as to form therewith lateral passages or ducts 30 which place said transverse chambers 23 in communication with one another.

The lower chamber 31 communicates with the fluid pressure valve duct 8 while the upper chamber 32 communicates with the discharge duct 9. As will be seen from FIG. 6, fluid passed through the duct 8 rises along an essentially serpentine run due to the alternate arrangement of said passages 30.

The upper chamber 32 is also in communication with the interspace zone 33 provided in the upper portion of the envelope 1 designed to be fitted to the side of the user. Said upper zone 33 is shown in cross section in FIG. 6 and, as may be noted from the FIG., it comprises a plurality of side-by-side or also horizontal chambers which do not communicate with each other laterally. The purpose of these chambers is exactly the same as those described and illustrated with reference to FIGS. 1 to 4.

Once the stimulator device has been fitted to the user, fluid (air) is pumped under pressure through the inlet valve 8. The air fills the interspace 3 passing from bottom to top with a serpentine path and causes the internal wall 25 to move inwards to contact the user's limb contained in the envelope 1. By successive operations of discharge and supply of air under pressure through the valve ducts 8 and 9 a massage action is developed on said limb. The subdivision of the interspace into a plurality of communicating transverse chambers guarantees a complete uniformity in the distribution of pressure on the limb with the achievement of high efficiency, where efficiency is meant as degree of elimination of accumulations of fat or cellulitis with a relatively low number of applications.

It has advantageously been noted that said uniformity of pressure distribution, and therefore of the massage, with high efficiency is obtained when the passages 30, which place the adjacent transverse chambers in communication with each other, increase in size from the lower chambers towards the upper chambers. Again for better maintenance and for a greater working regularity of the stimulator device according to the invention, it is advantageous to begin the supply of air under pressure through the duct 8 while the discharge duct 9 is still open. In practice, this arrangement enables the washing of the transverse chambers 23 and the elimination of possible stagnations of air supplied during the preceding phase.

In FIGS. 7 and 8 there is shown another embodiment of the device according to the invention. According to this modified embodiment, the interspace defined in the lateral surface of the envelope 1 is divided into a plurality of transverse chambers 34 provided as a result of the presence of transverse solder join lines 35 which extend to the longitudinal solder join lines 29 and 28. Said transverse chambers 34 are in superposed relationship and do not communicate with one another. Each of said chambers 34 is connected to a single fluid pressure source through a respective duct 36 and a timer device which controls the opening of valve units provided for each of said ducts 36. In this embodiment of the stimulator device according to the invention fluid under pressure is passed starting from the lower chamber reaches and the passing of fluid under pressure into the chamber immediately above said lower chamber only when the pressure in the lower chamber reaches a desired value. This procedure is analogous for all of the chambers into which the interspace defined by the envelope 1 is divided. When the upper chamber reaches the desired pressure value the valve means are opened to discharge the fluid through the same ducts through which the fluid was supplied. The discharge phase can be simultaneous for all the chambers and may also, according to needs of use, be carried out starting from the top downwards with time phasing.

It will be evident that it is possible with this embodiment of the stimulation device according to the invention to subject the limb to which the device is fitted to differentiated pressure along its length. This is particularly advantageous when the limb, or portions thereof, require particular attention for various contingent reasons.

The massage effected by this embodiment of stimulator device according to the invention is even more efficient than that of the devices described previously because when the lymphatic liquids are freed from the accumulations of fat or cellulitis they are forced to rise along the limb and are not allowed to recirculate downwards; in practice there occurs a kind of extrusion of the lymphatic liquids from the bottom towards the top.

In FIG. 9 there is shown a further embodiment of stimulator device according to the invention. With reference to FIG. 9, the device comprises a pair of devices 101 and 101a, of the type shown in FIGS. 7 and 8, which are connected together in order to enable the simultaneous treatment of the lower limbs of the user. In this case, as clearly shown, the envelopes are connected together in their upper zones 102 and 103 respectively which are designed to be arranged around the sides of the user. The interspaces defined by said zones 102 and 103 are advantageously divided into a plurality of transverse superposed chambers 104 and 105 by means of horizontal heat soldering lines 106 and 107 respectively. Said soldering lines 106 and 107 terminate at a certain distance from the lateral edges of the zones 102 and 103 so that the chambers 104 and 105 communicate along passages or ducts 108 and 108a. The zones 104 and 105 are spaced apart by an intermediate portion 109 which does not define an interspace and is designed to arrange against the back of the user.

In practice the materials used, as well as the dimensions, may be varied according to needs.

I claim:

1. A stimulator device for stimulating the flow of blood and lymphatic fluids in the limbs of a body, which comprises a first extended envelope in deformable material, a second envelope in deformable material arranged inside said first envelope and connected thereto to define an interspace, said first envelope being closed at one end and open at the opposite end to form an opening, said opening being shaped so that a portion thereof may receive the user's groin, valve means being provided for supplying and evacuating a fluid under pressure to and from said interspace in order to increase and decrease the pressure in said interspace, the increase of pressure in said interspace being arranged to cause the wall of said second envelope to move inwards and come into pressure contact with the limb to which the stimulator device is fitted, securing means being provided for the firm releasable fitting of the stimulator device to the side of the user.

2. A device according to claim 1, wherein said first envelope and said second envelope are connected together along parallel spaced-apart connection lines, said connection lines being arranged to extend for a portion longitudinally and in front and for a further portion adjacent the groin zone, said connection lines defining strip-like zones which do not communicate with said interspace.

3. A stimulator device according to claim 1, wherein said first and said second envelope are connected together along connection lines which extend longitudinally in the zone of the device designed to receive the side hip portion and the gluteus of the user, said connection lines defining interspace zones which do not communicate with one another laterally.

4. A stimulator device according to claim 1, wherein said interspace is divided into a plurality of transverse chambers communicating with said fluid pressure source and said discharge duct the uppermost chamber of said plurality of chambers being also arranged to communicate with the portion of said interspace relative to the zone of said envelope designed to be fitted to the side of the user.

5. A stimulator device according to claim 4, wherein said plurality of transverse chambers communicate with each other through a plurality of ducts provided in said interspace, the lowermost chamber being arranged to communicate with said fluid pressure source, the uppermost chamber being in communication with said discharge duct.

6. A stimulator device according to claim 5, wherein said plurality of ducts are arranged longitudinally adjacent the longitudinal soldering lines of said interspace, said arrangement defining a serpentine path for the fluid supplied to the interspace under pressure.

7. A stimulator device according to claim 4, wherein said transverse chambers do not communicate with each other, each of said chambers being arranged to communicate with a fluid pressure source through respective supply ducts, the discharge of said fluid under pressure being effected along said supply ducts.

8. A stimulator device according to claim 1, wherein said envelope is formed from a pair of flat walls which are connected together to form said interspace, and are provided along their longitudinal edges with closure means which engage after the mounting of said pair of connected walls around the limb for which the device is intended.

9. A stimulator device according to claim 1, wherein said fluid under pressure is air.

10. A stimulator device according to claim 1, wherein said fluid under pressure is a liquid.